US012608672B2

(12) United States Patent　　(10) Patent No.:　US 12,608,672 B2
DeRodes et al.　　(45) Date of Patent:　Apr. 21, 2026

(54) LARGE LANGUAGE MODEL (LLM) INTEGRATION FOR SCENARIO GENERATION IN A RISK MANAGEMENT PLATFORM

(71) Applicant: Fusion Risk Management, Inc., Chicago, IL (US)

(72) Inventors: Robert Davis DeRodes, Morrisville, NC (US); Zachary Keller, Chicago, IL (US); James Post, Houston, TX (US)

(73) Assignee: FUSION RISK MANAGEMENT, INC., Chicago, IL (US)

( * ) Notice: Subject to any disclaimer, the term of this patent is extended or adjusted under 35 U.S.C. 154(b) by 228 days.

(21) Appl. No.: 18/485,264

(22) Filed: Oct. 11, 2023

(65) Prior Publication Data

US 2025/0124393 A1　Apr. 17, 2025

(51) Int. Cl.
*G06Q 10/067*　(2023.01)
*G06F 40/20*　(2020.01)

(52) U.S. Cl.
CPC ........... *G06Q 10/067* (2013.01); *G06F 40/20* (2020.01)

(58) Field of Classification Search
CPC .............................. G06F 40/20; G06Q 10/067
USPC ........................................................ 705/348
See application file for complete search history.

(56) References Cited

U.S. PATENT DOCUMENTS 12,346,357 B2 * 7/2025 Aghajanyan ........ G06F 16/3344
2019/0096217 A1 * 3/2019 Pourmohammad .... G08B 31/00

2022/0100958 A1 * 3/2022 Kiazand ................... G06N 3/08
2022/0405486 A1 * 12/2022 Ziskovsky .............. G10L 13/02
2024/0281619 A1 * 8/2024 Koneru ................... G06F 40/35
2024/0289733 A1 * 8/2024 Singh ............... G06Q 10/08345
(Continued)

FOREIGN PATENT DOCUMENTS

CN　　118626575 A　*　9/2024 ............. G06N 5/022

OTHER PUBLICATIONS

"Data-Driven Weather Forecasting and Climate Modeling from the Perspective of Development," by Yuting Wu and Wei Xue, Jun. 6, 2024 (Year: 2024).*

(Continued)

*Primary Examiner* — Michael P Harrington
*Assistant Examiner* — Brian Adams Heflin
(74) *Attorney, Agent, or Firm* — CRGO Global; Steven M. Greenberg

(57)　　　　　　　ABSTRACT

Scenario generation includes establishing a communicative coupling between a computer-generated business continuity management user interface and a selected large language model (LLM). Scenario generation includes specifying an adverse event in the user interface and querying a database of scenario description records for an organization with the specified adverse event in order to receive a vector of relevant data to the specified adverse event. Scenario generation further includes first tuning a pre-determined LLM prompt with the vector to produce a specific LLM prompt for the specified adverse event and then submitting the specific LLM prompt to the selected LLM from over the communicative coupling. The selected LLM returns to the user interface scenario text referring to a plausible instance of the specified adverse event. Finally, scenario generation includes persisting the scenario text into persistent storage in connection with a specific scenario for use in a scenario simulation engine.

12 Claims, 3 Drawing Sheets

(56) References Cited

U.S. PATENT DOCUMENTS

| | | | |
|---|---|---|---|
| 2025/0086310 A1* | 3/2025 | Cuomo | G06F 21/6245 |
| 2025/0095039 A1* | 3/2025 | Tu | H04L 51/02 |
| 2025/0124930 A1* | 4/2025 | Zhou | G10L 17/00 |
| 2025/0190454 A1* | 6/2025 | Patil | G06F 16/3326 |

OTHER PUBLICATIONS

Tao Li, Data-Driven Techniques in Disaster Information Management, ACM Computing Surveys, vol. 50, No. 1, Article 1 (Mar. 2017).

* cited by examiner

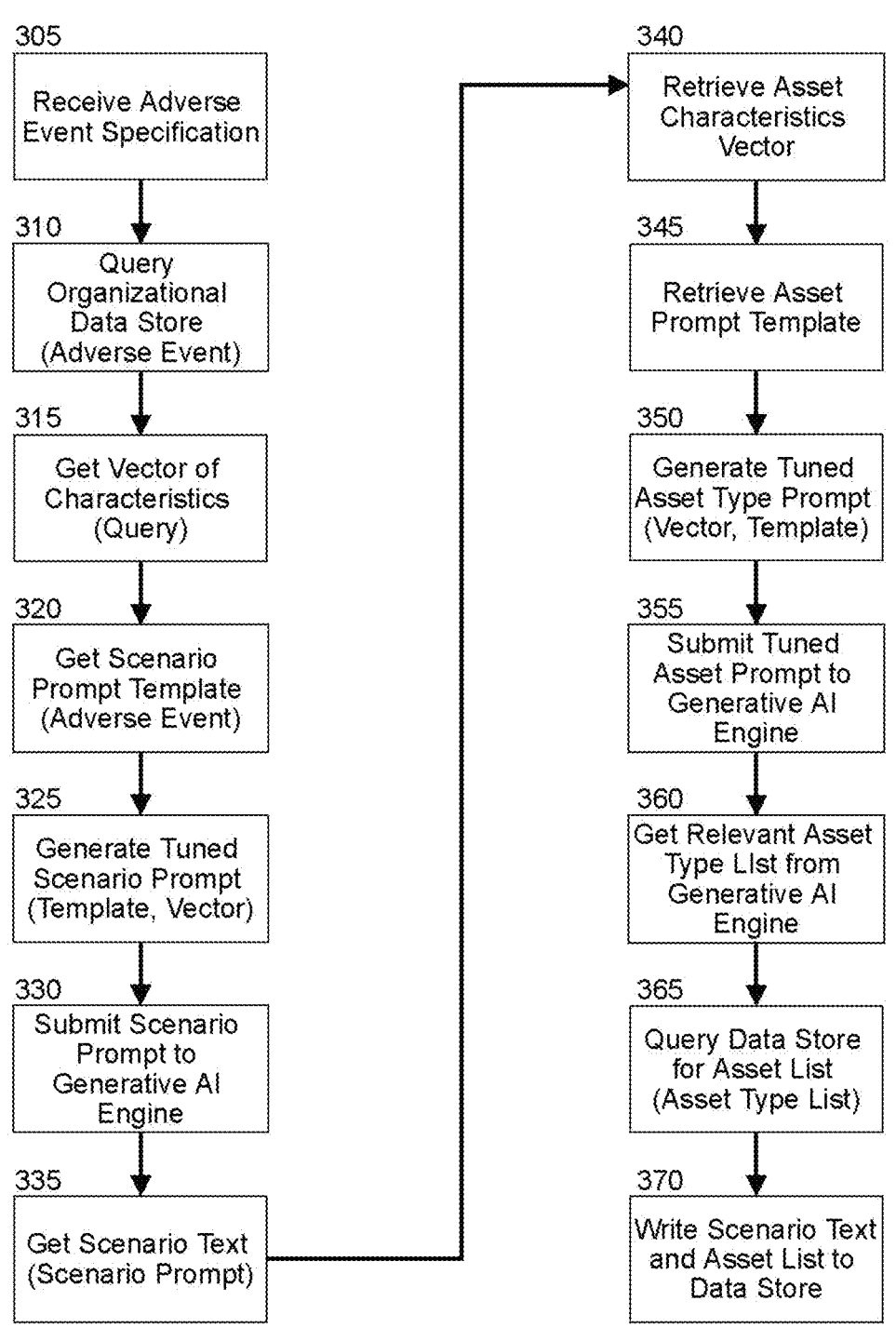

305
Receive Adverse
Event Specification

310
Query
Organizational
Data Store
(Adverse Event)

315
Get Vector of
Characteristics
(Query)

320
Get Scenario
Prompt Template
(Adverse Event)

325
Generate Tuned
Scenario Prompt
(Template, Vector)

330
Submit Scenario
Prompt to
Generative AI
Engine

335
Get Scenario Text
(Scenario Prompt)

340
Retrieve Asset
Characteristics
Vector

345
Retrieve Asset
Prompt Template

350
Generate Tuned
Asset Type Prompt
(Vector, Template)

355
Submit Tuned
Asset Prompt to
Generative AI
Engine

360
Get Relevant Asset
Type List from
Generative AI
Engine

365
Query Data Store
for Asset List
(Asset Type List)

370
Write Scenario Text
and Asset List to
Data Store

FIG. 3

LARGE LANGUAGE MODEL (LLM) INTEGRATION FOR SCENARIO GENERATION IN A RISK MANAGEMENT PLATFORM

BACKGROUND OF THE INVENTION

Field of the Invention

The present invention relates to the technical field of business continuity planning and disaster recovery and more particularly to the integration of a large language model (LLM) in a business continuity management system.

Description of the Related Art

Business continuity planning refers to the planning involved in a business organization addressing prospective adverse events so as to ensure the continuous operation of the organization during the course of such adverse events. Disaster recovery planning is an extension of business continuity planning in which mechanisms and requirements are specified in order to promote the recovery of an organization impacted by an adverse event. Historically, both business continuity planning and disaster recovery planning have been manually processes performed by a team of analysts crafting and completing spreadsheet-like what-if analyses in regard to different disaster scenarios imagined by the planning team. More recently, however, much of business continuity planning has been automated.

In this regard, automated business continuity and disaster recovery planning tools tap information in a database cataloging different organizational assets with different exposures to different adverse events and process those assets against a specified scenario involving one or more of the adverse events. This processing generally results in the production of a manifest of assets exposed to the one or more adverse events of the specified scenario. The manifest, in turn, may be processed against pre-stored data in order to enumerate a cost of the impact of the one or more of the adverse events upon the assets of the manifest, and a time required to return those of the impacted assets to nominal operating condition. As such, a team reviewing the automated analysis can simulate an improvement in preparedness for the scenario by modifying the characterization of one or more of the assets in the manifest in order to lower the cost of impact, reduce the time required to return the impacted assets to nominal operating condition, or both.

Essential to the automated analysis, then, is the generation of a robust set of plausible scenarios. Presently, scenario generation is strictly a manual process. As such, ensuring that each adverse event of a generated scenario is plausible, e.g. probable to occur, is left to the human operator crafting the scenario. Of course, enumerating enough plausible scenarios for scenario testing the infrastructure of a typical organization is no small task. To be truly effective, a wide range of scenarios must be generated and, each one must be plausible in the context of the organization subject to the scenario testing. Absent a sufficient number of scenarios to be tested for an organization, the business continuity and disaster recovery plan of the organization simply cannot be predicted in a reliable way.

BRIEF SUMMARY OF THE INVENTION

Embodiments of the present invention address technical deficiencies of the art in respect to scenario generation for use in scenario simulation in managing business continuity. To that end, embodiments of the present invention provide for a novel and non-obvious method for scenario generation method in a business continuity management system. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a scenario generation method in a business continuity management system includes establishing a communicative coupling over a computer communications network between a computer-generated business continuity management user interface of the business continuity management system and a selected large language model (LLM). The method additionally includes specifying an adverse event in the user interface and querying a database of scenario description records for an organization with the specified adverse event in order to receive a vector of relevant data to the specified adverse event. The method further includes first tuning a pre-determined LLM prompt with the vector of relevant data to produce a specific LLM prompt for the specified adverse event and then submitting the specific LLM prompt to the selected LLM from over the communicative coupling. The selected LLM in response returns to the user interface over the communicative coupling scenario text referring to a plausible instance of the specified adverse event. Finally, the method includes persisting the scenario text into persistent storage in connection with a specific scenario for use in a scenario simulation engine or table top simulation activity.

In one aspect of the embodiment, the method additionally includes retrieving the scenario text from the persistent storage, extracting from the persistent storage a vector of infrastructure asset characteristics, tuning an additional pre-determined LLM prompt with the vector of infrastructure asset characteristics to produce an additional specific LLM prompt for the specific scenario and then submitting the additional specific LLM prompt to an additional LLM from over the communicative coupling, with the additional LLM returning to the user interface over the communicative coupling, a list of infrastructure asset types sharing the infrastructure asset characteristics so as to be affected by the specific scenario. As such, the asset database of the organization may then be queried with the asset types in the list in order to retrieve a concrete set of infrastructure assets affected by the specific scenario. Thereafter, the concrete set of infrastructure assets can be persisted in association with the scenario text in the persistent storage for use in the scenario simulation engine.

Additional aspects of the embodiment include one or more combinations of one or more of the following:

The selected LLM and the additional LLM are a single LLM.

The scenario text is formatted into an annotated document according to a uniform schema and the annotated document is submitted to the scenario simulation engine from over the computer communications network.

The specified adverse event is limited to a set of event classifications presented in a listing in the user interface.

In another embodiment of the invention, a data processing system is adapted for scenario generation. The system includes a host computing platform of one or more computers, each with memory and one or processing units including one or more processing cores. The system also includes a business continuity management system executing in the host computing platform and including both a database of scenario description records for an organization and an asset database of the organization, and also a user interface providing access to the database of scenario description records and the asset database. The system yet further includes a scenario generation module coupled to the business continuity management system and including computer program instructions enabled while executing in the memory of at least one of the processing units of the host computing platform.

The program instructions when executing establish a communicative coupling over a computer communications network between the user interface of the business continuity management system and a selected LLM. The program instructions additionally specify an adverse event in the user interface and query the database of scenario description records with the specified adverse event in order to receive a vector of relevant data to the specified adverse event. The program instructions yet further tune a pre-determined LLM prompt with the vector of relevant data to produce a specific LLM prompt for the specified adverse event, and then submit the specific LLM prompt to the selected LLM from over the communicative coupling, so that the selected LLM returns to the user interface over the communicative coupling scenario text referring to a plausible instance of the specified adverse event. Finally, the program instructions persist the scenario text into persistent storage in connection with a specific scenario for use in a scenario simulation engine.

In this way, the technical deficiencies of the generation of a sufficient number of plausible scenarios for testing the continuity plan of an organization are overcome owing to repeated accessing of an LLM to produce scenario text and the tuning of the LLM to produce scenario text that is plausible based upon the identification of assets of the organization which are pertinent to the adverse events of the scenario to be generated.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for scenario generation in a business continuity management system. In accordance with an embodiment of the invention, an adverse event can be specified within a user interface of a business continuity management system. A database of organizational characteristics is then queried with the adverse event in order to retrieve a vector of different organizational characteristics, such as geographic location, industrial segments, customer types, logistical dependencies, and the like. A pre-specified prompt template for the adverse event is then modified to incorporate the vector and the modified prompt is submitted to an LLM of a generative AI engine. The AI engine in return provides scenario text for the adverse event with plausibility resulting from the vector and the scenario text can then be persisted in a scenario data store in connection with the adverse event. In this way, the repeated specification of adverse events in the user interface can result in the repeated generation of plausible scenarios for use in a scenario simulation engine.

Figure 1:
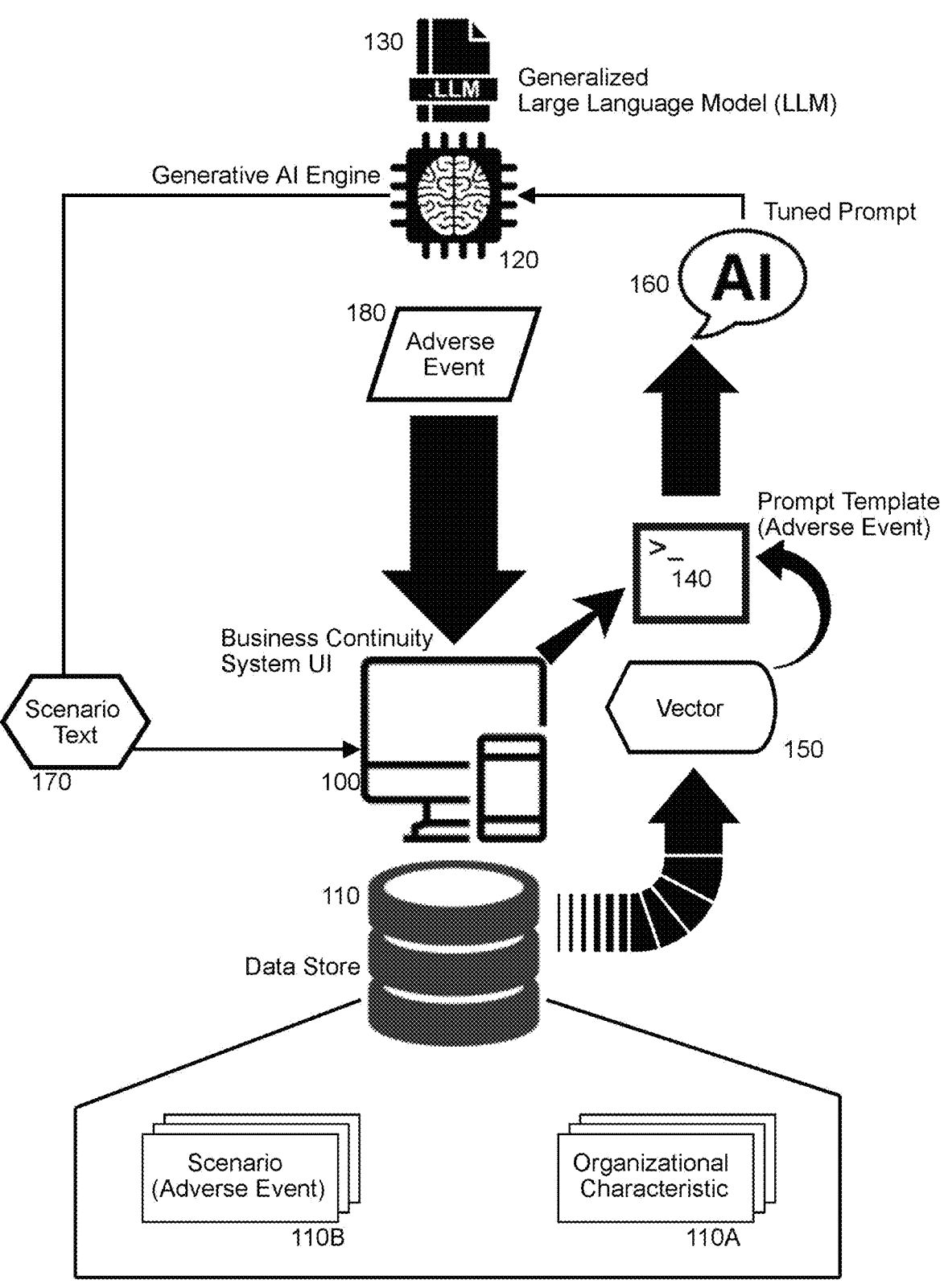
FIG. 1 is a pictorial illustration reflecting different aspects of a process of scenario generation in a business continuity management system.

In illustration of one aspect of the embodiment, FIG. 1 pictorially shows a process of scenario generation. As shown in FIG. 1, an end user specifies an adverse event 180 into the user interface 100 of a business continuity system. The adverse event 180 includes, for example a weather event such as a hurricane, snow storm or heat wave, an infrastructure event such as a power outage, road closure or telecommunications failure, a cyberattack or unauthorized network intrusion, or a natural disaster such as an outbreak of a disease or a riot. Thereafter, a data store 110 is queried to retrieve a vector 150 of different organizational characteristics 110A of a subject organization such as a business enterprise, including geographic location, type of building, number and demographic of employees, industrial segment, modes of communication, means of delivery of an organizational service, means of producing an organizationally produced product, and the like.

With the vector 150 of the different organizational characteristics 110A, a prompt template 140 is modified to incorporate the elements of the vector 150 in order to produce a tuned LLM prompt 160. As such, the tuned LLM prompt 160 is then submitted to a generative AI engine 120 which in turns queries the LLM 130 of the generative AI engine 120 in order to return scenario text 170, plausible to the adverse event 180 in light of the vector 150 of different organizational characteristics 110A. The scenario text 170 is then included in a scenario 110B in the data store 110 in association with the adverse event 180 for use in a simulation engine simulating the impact of the adverse event upon the organization.

Optionally, the LLM 130 returns in the scenario text 170 an indication that the tuned LLM prompt 160 includes a vector 150 of different organizational characteristics 110A that is incompatible with the adverse event 180, such as a natural disaster that does not occur within geographic proximity of the subject organization, or an electrical power outage connected to equipment which operate on battery or solar power, or a political condition in a jurisdiction foreign to the organization. But in either the base circumstance or the optional circumstance, the scenario subjected to the simulation engine is plausible in that the scenario returned by the LLM 130 is constrained to those organizational characteristics evident in the vector 150 used to produce the tuned prompt 160.

Figure 2:
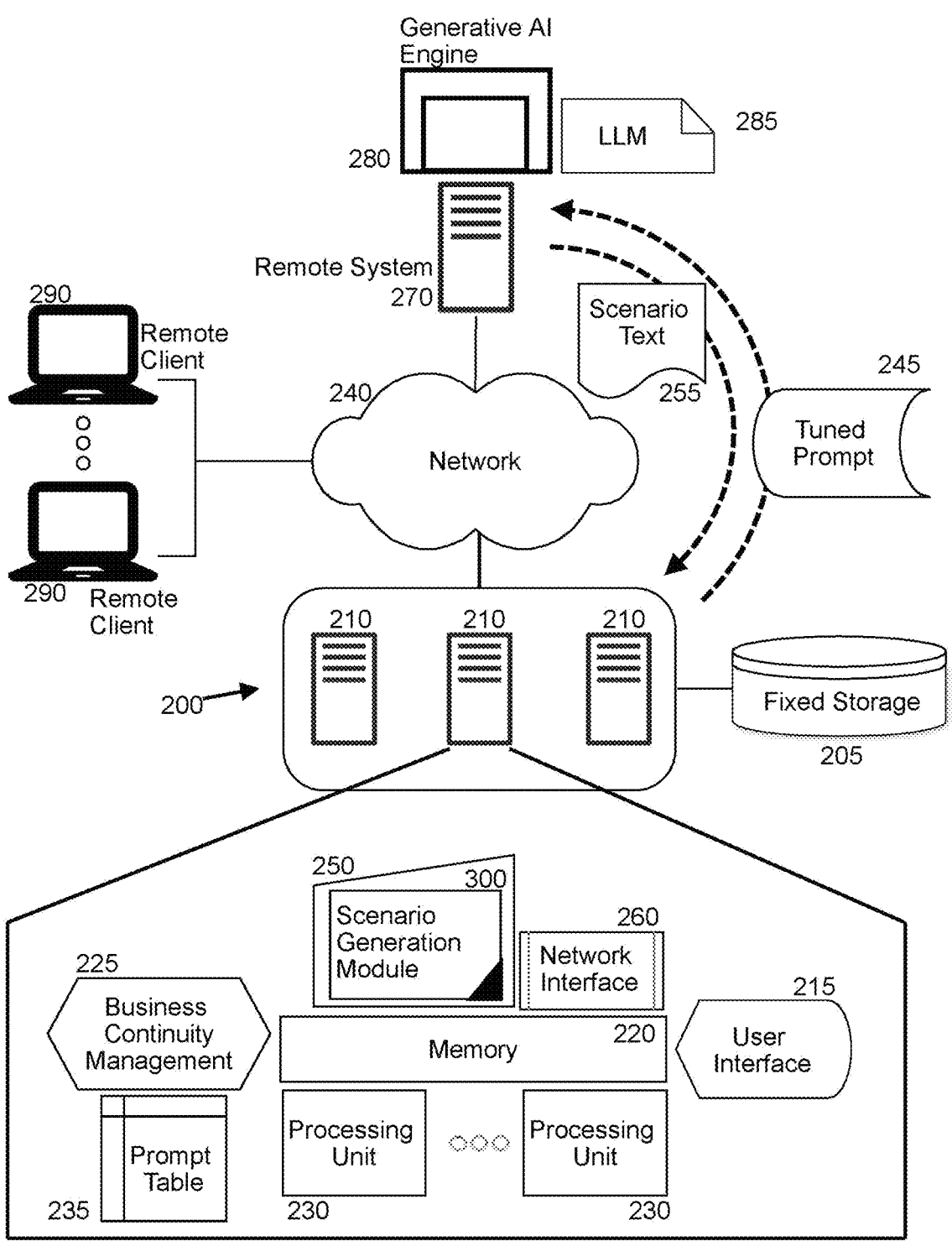
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform scenario generation. In the data processing system illustrated in FIG. 1, a host computing platform 200 is provided. The host computing platform 200 includes one or more computers 210, each with memory 220 and one or more processing units 230. The computers 210 of the host computing platform (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

The host computing platform 200 is communicatively coupled over data communications network 240 to a remote computing system 270 supporting the operation of a generative AI engine 280 providing access to an LLM 285 so that prompts received in the generative AI engine 280 are provided to the LLM 285 in response to which the LLM 285 provides responsive text. As well, a business continuity management system 225 executes in the host computing platform 200 by the processing units 230 and acts to simulate different scenarios expressed in scenarios persisted in fixed storage 205. To that end, end users access the business continuity management system 225 from over the data communications network 240 through a user interface 215 to the business continuity management 225 by way respectively different remote clients 290.

Notably, a computing device 250 including a non-transitory computer readable storage medium can be included with the data processing system 200 and accessed by the processing units 230 of one or more of the computers 210. The computing device stores 250 thereon or retains therein a scenario generation module 300 that includes computer program instructions which when executed by one or more of the processing units 230, performs a programmatically executable process for scenario generation. Specifically, the program instructions during execution receive through a user interface 215 to the business continuity management system 225, a specification of one or more different adverse events in respect to a particular organization. In response, the program instructions generate a plausible scenario for the adverse events in the context of the characteristics of the business organization, for storage in the fixed storage 205 and subsequent use by the business continuity management system 225 in simulating the scenario.

More specifically, the program instructions identify in a prompt table 235 in the memory 220, a template for a prompt to the LLM 285 pertaining to one or more of the adverse events. The program instructions then retrieve the identified prompt from fixed storage 205 and issue a query to a database in the fixed storage 205 with respect to the adverse events in order to retrieve a vector of elements, each referring to a characteristic of the organization. Thereafter, the program instructions modify the identified prompt with the elements of the vector in order to produce a tuned prompt 245 and transmit the tuned prompt 245 over the data communications network 240 to the generative AI engine 280. The generative AI engine 280 responds with scenario text 255 responsive to the tuned prompt 245. As such, the program instructions persist the scenario text 255 in a scenario document in the fixed storage 205 as a scenario plausible for the specific adverse event or events and the specified organization.

In further illustration of an exemplary operation of the module, FIG. 3 is a flow chart illustrating one of the aspects of the process of FIG. 1. Beginning in block 305, an adverse event is specified in connection with an organization within a user interface to a business continuity management system. In block 310, an organizational data store is queried in connection with the organization and the adverse event in order to retrieve in block 315 a vector of characteristics of the organization pertinent to the specified adverse event. Subsequently, in block 320 a scenario prompt template is retrieved correlating to the specified adverse event and in block 325, a tuned scenario prompt is generated by modifying the scenario prompt template with the vector of characteristics of the organization. In block 330, the tuned scenario prompt is submitted to a generative AI engine incorporating an LLM and in block 335, scenario text is received from the generative AI engine as produced by the LLM.

In block 340, one or more organizational asset characteristics are retrieved from persistent storage. Concurrently, in block 345, an asset type prompt template is retrieved and in block 350, the asset type prompt template is modified to account for the asset characteristics, in order to produce a tuned asset prompt. Subsequently, in block 355, the tuned asset prompt is submitted to the generative AI engine and in block 360 an asset type list is received from the generative AI engine as produced by the LLM. With the asset type list, in block 365 the organizational data store is queried in order to identify the existence of specific assets of the organization corresponding to the asset types in the list. Finally, in block 370, the specific assets are written to the data store along with the scenario text in order to have generated a plausible scenario for the organization in simulating the scenario for the purpose of analyzing the business continuity and disaster recovery abilities of the organization.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A scenario generation method in a business continuity management system, the method comprising:

establishing a communicative coupling over a computer communications network between a computer-generated business continuity management user interface of the business continuity management system and a selected large language model (LLM);

specifying an adverse event in the user interface and querying a database of scenario description records for an organization with the specified adverse event in order to receive a vector of relevant data to the specified adverse event;

tuning a pre-determined LLM prompt with the vector of relevant data to produce a specific LLM prompt for the specified adverse event;

submitting the specific LLM prompt to the selected LLM from over the communicative coupling, the selected LLM returning to the user interface over the communicative coupling scenario text referring to a plausible instance of the specified adverse event;

persisting the scenario text into persistent storage in connection with a specific scenario for use in a scenario simulation engine;

retrieving the scenario text from the persistent storage;

extracting from the persistent storage a vector of infrastructure asset characteristics;

tuning an additional pre-determined LLM prompt with the vector of infrastructure asset characteristics to produce an additional specific LLM prompt for the specific scenario;

submitting the additional specific LLM prompt to an additional LLM from over the communicative coupling, the additional LLM returning to the user interface over the communicative coupling, a list of infrastructure asset types sharing the infrastructure asset characteristics so as to be affected by the specific scenario;

querying an asset database of the organization with the asset types in the list to retrieve a concrete set of infrastructure assets affected by the specific scenario; and, persisting the concrete set of infrastructure assets in association with the scenario text in the persistent storage for use in the scenario simulation engine.

2. The method of claim 1, wherein the selected LLM and the additional LLM are a single LLM.

3. The method of claim 1, further comprising formatting the scenario text into an annotated document according to a uniform schema and submitting the annotated document to the scenario simulation engine from over the computer communications network.

4. The method of claim 1, wherein the specified adverse event is limited to a set of event classifications presented in a listing in the user interface.

5. A data processing system adapted for scenario generation, the system comprising:

a host computing platform comprising one or more computers, each with memory and one or more processing units including one or more processing cores;

a business continuity management system executing in the host computing platform and comprising both a database of scenario description records for an organization and an asset database of the organization, and also a user interface providing access to the database of scenario description records and the asset database; and, a scenario generation module coupled to the business continuity management system and comprising computer program instructions enabled while executing in the memory of at least one of the processing units of the host computing platform to perform:

establishing a communicative coupling over a computer communications network between the user interface of the business continuity management system and a selected large language model (LLM);

specifying an adverse event in the user interface and querying the database of scenario description records with the specified adverse event in order to receive a vector of relevant data to the specified adverse event;

tuning a pre-determined LLM prompt with the vector of relevant data to produce a specific LLM prompt for the specified adverse event;

submitting the specific LLM prompt to the selected LLM from over the communicative coupling, the selected LLM returning to the user interface over the communicative coupling scenario text referring to a plausible instance of the specified adverse event;

persisting the scenario text into persistent storage in connection with a specific scenario for use in a scenario simulation engine;

retrieving the scenario text from the persistent storage;

extracting from the persistent storage a vector of infrastructure asset characteristics;

tuning an additional pre-determined LLM prompt with the vector of infrastructure asset characteristics to produce an additional specific LLM prompt for the specific scenario;

submitting the additional specific LLM prompt to an additional LLM from over the communicative coupling, the additional LLM returning to the user interface over the communicative coupling, a list of infrastructure asset types sharing the infrastructure asset characteristics so as to be affected by the specific scenario;

querying an asset database of the organization with the asset types in the list to retrieve a concrete set of infrastructure assets affected by the specific scenario; and, persisting the concrete set of infrastructure assets in association with the scenario text in the persistent storage for use in the scenario simulation engine.

6. The system of claim 5, wherein the selected LLM and the additional LLM are a single LLM.

7. The system of claim 5, wherein the program instructions further perform formatting the scenario text into an annotated document according to a uniform schema and submitting the annotated document to the scenario simulation engine from over the computer communications network.

8. The system of claim 5, wherein the specified adverse event is limited to a set of event classifications presented in a listing in the user interface.

9. A computing device comprising a non-transitory computer readable storage medium having program instructions stored therein, the instructions being executable by at least one processing core of a processing unit to cause the processing unit to perform scenario generation by:

establishing a communicative coupling over a computer communications network between a computer-generated business continuity management user interface and a selected large language model (LLM);

specifying an adverse event in the user interface and querying a database of scenario description records for an organization with the specified adverse event in order to receive a vector of relevant data to the specified adverse event;

tuning a pre-determined LLM prompt with the vector of relevant data to produce a specific LLM prompt for the specified adverse event;

submitting the specific LLM prompt to the selected LLM from over the communicative coupling, the selected LLM returning to the user interface over the communicative coupling scenario text referring to a plausible instance of the specified adverse event;

persisting the scenario text into persistent storage in connection with a specific scenario for use in a scenario simulation engine;

retrieving the scenario text from the persistent storage;

extracting from the persistent storage a vector of infrastructure asset characteristics;

tuning an additional pre-determined LLM prompt with the vector of infrastructure asset characteristics to produce an additional specific LLM prompt for the specific scenario;

submitting the additional specific LLM prompt to an additional LLM from over the communicative coupling, the additional LLM returning to the user interface over the communicative coupling, a list of infrastructure asset types sharing the infrastructure asset characteristics so as to be affected by the specific scenario;

querying an asset database of the organization with the asset types in the list to retrieve a concrete set of infrastructure assets affected by the specific scenario; and, persisting the concrete set of infrastructure assets in association with the scenario text in the persistent storage for use in the scenario simulation engine.

10. The device of claim 9, wherein the selected LLM and the additional LLM are a single LLM.

11. The device of claim 9, wherein the instructions are executable to further cause the processing unit to perform formatting the scenario text into an annotated document according to a uniform schema and submitting the annotated document to the scenario simulation engine from over the computer communications network.

12. The device of claim 9, wherein the specified adverse event is limited to a set of event classifications presented in a listing in the user interface.

\* \* \* \* \*